United States Patent
Said

(10) Patent No.: US 12,417,105 B2
(45) Date of Patent: *Sep. 16, 2025

(54) EXTENSIBLE PLATFORM FOR ORCHESTRATION OF DATA WITH BUILT-IN SCALABILITY AND CLUSTERING

(71) Applicant: Keross FZ-LLC, Dubai (AE)

(72) Inventor: Farouk Said, Dubai (AE)

(73) Assignee: Keross FZ-LLC, Dubai (AE)

( * ) Notice: Subject to any disclaimer, the term of this patent is extended or adjusted under 35 U.S.C. 154(b) by 340 days.

This patent is subject to a terminal disclaimer.

(21) Appl. No.: 17/444,763

(22) Filed: Aug. 10, 2021

(65) Prior Publication Data

US 2023/0052148 A1    Feb. 16, 2023

(51) Int. Cl.
  *G06F 9/44*      (2018.01)
  *G06F 9/445*     (2018.01)
  *G06F 9/54*      (2006.01)

(52) U.S. Cl.
  CPC .......... *G06F 9/44505* (2013.01); *G06F 9/547* (2013.01)

(58) Field of Classification Search
  CPC ................. G06F 1/32; G06F 9/44; G06F 1/12
  See application file for complete search history.

(56) References Cited

U.S. PATENT DOCUMENTS

| | | | |
|---|---|---|---|
| 7,490,073 B1 | 2/2009 | Qureshi et al. | |
| 8,539,567 B1 | 9/2013 | Logue et al. | |
| 9,392,077 B2 * | 7/2016 | Borzycki | G06F 21/6218 |
| 10,120,734 B1 | 11/2018 | Doraiswamy et al. | |
| 10,181,988 B1 | 1/2019 | Farah | |
| 11,102,251 B1 | 8/2021 | Pettit et al. | |
| 11,669,373 B2 | 6/2023 | Mittermeier | |
| 2006/0248189 A1 * | 11/2006 | Jerrard-Dunne | H04L 63/168 709/225 |
| 2007/0192464 A1 | 8/2007 | Tullberg et al. | |
| 2010/0106678 A1 | 4/2010 | Pietrek et al. | |
| 2010/0333105 A1 | 12/2010 | Horvitz et al. | |
| 2012/0243416 A1 * | 9/2012 | Hussain | H04L 12/40182 726/11 |
| 2012/0263440 A1 * | 10/2012 | Malin | H04N 21/6581 386/299 |
| 2015/0378763 A1 | 12/2015 | Hassine et al. | |
| 2016/0162478 A1 * | 6/2016 | Blassin | G06Q 10/063112 706/12 |
| 2016/0255420 A1 | 9/2016 | McCleland et al. | |
| 2017/0006113 A1 | 1/2017 | Singhal | |
| 2017/0034038 A1 | 2/2017 | Downey et al. | |
| 2017/0187573 A1 | 6/2017 | Haswell | |
| 2017/0364600 A1 * | 12/2017 | Sadauskas, Jr. | G06F 16/31 |
| 2018/0295134 A1 | 10/2018 | Gupta et al. | |
| 2018/0322170 A1 | 11/2018 | Alberton et al. | |

(Continued)

OTHER PUBLICATIONS

Non-final Office Action from U.S. Appl. No. 17/444,762, dated Aug. 6, 2023, 8 pp.

(Continued)

*Primary Examiner* — Keshab R Pandey

(74) *Attorney, Agent, or Firm* — ESPE Legal Consultancy FZ-LLC

(57) ABSTRACT

In a computer system, an orchestration platform includes extensible components that interact with external systems and technology. The platform scales by way of a plurality of application servers using a clustering architecture.

20 Claims, 10 Drawing Sheets

(56) References Cited

U.S. PATENT DOCUMENTS

| | | |
|---|---|---|
| 2019/0215688 A1 | 7/2019 | Zavesky et al. |
| 2019/0280949 A1* | 9/2019 | Wang ............... H04L 41/22 |
| 2020/0092258 A1 | 3/2020 | Stokes |
| 2021/0090080 A1 | 3/2021 | Kang et al. |
| 2021/0294596 A1 | 9/2021 | Ashirvad et al. |
| 2021/0400085 A1 | 12/2021 | Stokes |
| 2023/0050212 A1 | 2/2023 | Said |

OTHER PUBLICATIONS

USPTO, Non-Final Rejection dated Feb. 1, 2024, in U.S. Appl. No. 17/444,761, 177704_17444761_02-01-2024_CTNF.pdf, Feb. 1, 2024.
USPTO, Final Rejection dated Jul. 25, 2024, in U.S. Appl. No. 17/444,761, 177704_17444761_07-25-2024_CTFR.pdf, Jul. 25, 2024.
USPTO, Advisory Action dated Oct. 16, 2024, in U.S. Appl. No. 17/444,761, 177704_17444761_10-16-2024_CTAV.pdf, Oct. 16, 2024.
USPTO, Non-Final Rejection dated Aug. 7, 2023, in U.S. Appl. No. 17/444,762, 177704_17444762_08-07-2023_CTNF.pdf, Aug. 7, 2023.
USPTO, Notice of Allowance dated Feb. 1, 2024, in U.S. Appl. No. 17/444,762, 177704_17444762_02-01-2024_NOA.pdf, Feb. 1, 2024.

* cited by examiner

EXTENSIBLE PLATFORM FOR ORCHESTRATION OF DATA WITH BUILT-IN SCALABILITY AND CLUSTERING

TECHNICAL FIELD

The invention pertains to computer systems, including orchestration of data reception, processing, storage, and retrieval.

BACKGROUND

Computer systems increasingly manage large amounts of data on behalf of system users. In a typical environment, a large number of applications require access to data stored in a variety of databases with different structures and use cases. Over time, this diversity can create compatibility problems. For example, it may not be possible to make changes in one layer of a technology stack without having to make changes to the entire stack. Significant time and expense invested in a particular configuration can be lost when upgrading system components or migrating to new solutions.

Known orchestration solutions attempt to solve some aspects of these problems by virtualizing the interface between applications and data. The added orchestration layer between applications and data makes it easier to manage changes in system applications and databases. But interoperability with applications that are outside the system remains an issue. There is a need for computer systems that integrate internal applications and data with outside systems and technology.

SUMMARY

An orchestration platform includes an application stack and a database stack. The platform is extended by components that integrate and interact with technologies outside the core platform. The platform extension deploys a surrogate component or probe that acts as a bridge between the core platform and the extension technology. Multiple instances of the probe can be deployed on the platform extension in accordance with technical requirements.

The probe is a standalone component that can be installed in Unix/Windows based computers, server or desktop with a unique key that is generated in the admin portal of the platform.

In an embodiment, the probe executes Javascript, Jython or Scala scripts. The scripts can use the embedded libraries and application program interfaces (APIs) that the probe exposes. It can also download additional libraries (JAR files) on demand, to incorporate functionality not available off-the-shelf.

In a further embodiment, the probe establishes connection with the platform and polls for "instructions" to be executed in the probe on schedule. The instructions are posted in the platform, tagged for a probe. These instructions contain "Remote Execution Service" definitions, i.e., scripts that use probe libraries and APIs to connect to any external systems or technology and send collected data to the platform.

In an embodiment, the platform includes up to four application servers that can be horizontally scaled. One of these servers acts as a portal server. This server serves static content, such as html content, and bundled libraries, such as JavaScript libraries. A second server acts as a web server. The web server serves dynamic data as a REST request and response cycle. A third server acts as a job server. The job server executes background jobs as part of process models. A fourth server is a collector server that collects data from probes. Collector server nodes subscribe to various probe data receiver queues, and the queues serve data in a round-robin strategy to ensure that only one collector server node processes the same data at the same time. The platform further provides semantics for distributed locking and distributed caching to manage clustered data processing environments as needed.

DETAILED DESCRIPTION

An orchestration platform comprises an ecosystem that includes an application server stack and a database server stack. Additional platform extension architecture includes platform probes. Multiple instances of these probes can be installed at remote network locations. The platform probes may be controlled from an administration console of the platform.

In one embodiment, probes come with specialized libraries. The focus of these libraries follows particular use cases such as robotics, data collection from industry standard databases, data collection and management of IP-enabled devices, and remote program and script execution.

Extension libraries can also be injected into the probe after installation. These libraries enhance or upgrade existing probe capabilities to incorporate various technologies.

An HTTPD server acts as the entry point to the platform. This HTTPD server may also act as a request forwarder and load balancer to the platform application server stack. In the description that follows, HTTPD refers to Apache HyperText Transfer Protocol or Apache HTTP Server. Alternatively, nginx or another solution with similar functionality may be used.

Figure 1:
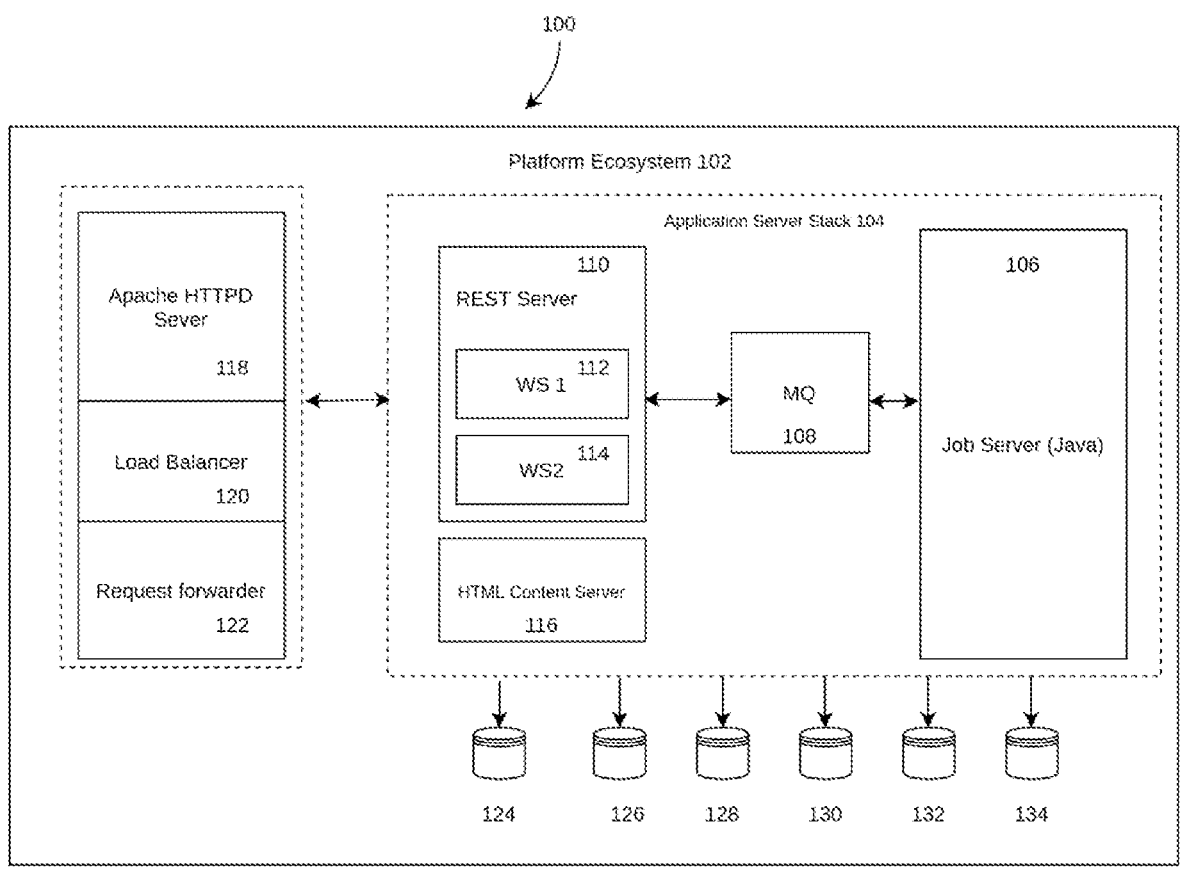
FIG. 1 shows details of an orchestration platform ecosystem.

FIG. 1 shows an orchestration-platform ecosystem 100. Platform ecosystem 102 includes an application server stack 104. Application server stack 104 includes job server 106, and Message Queue (MQ or IBM MQ) server 108. REST server 110 includes web servers 1 and 2 (112, 114). HTML Content Server 116 is also part of application server stack 104. An HTTPD server 118 includes load balancer 120 and request forwarder 122. In communication with application server stack 104 are databases 124, 126, 128, 130, 132, and 134. Databases 124-134 are selected according to use cases and may include Cassandra, MongoDB, MySQL, MariaDB, ElasticSearch, and Redis.

Figure 2:
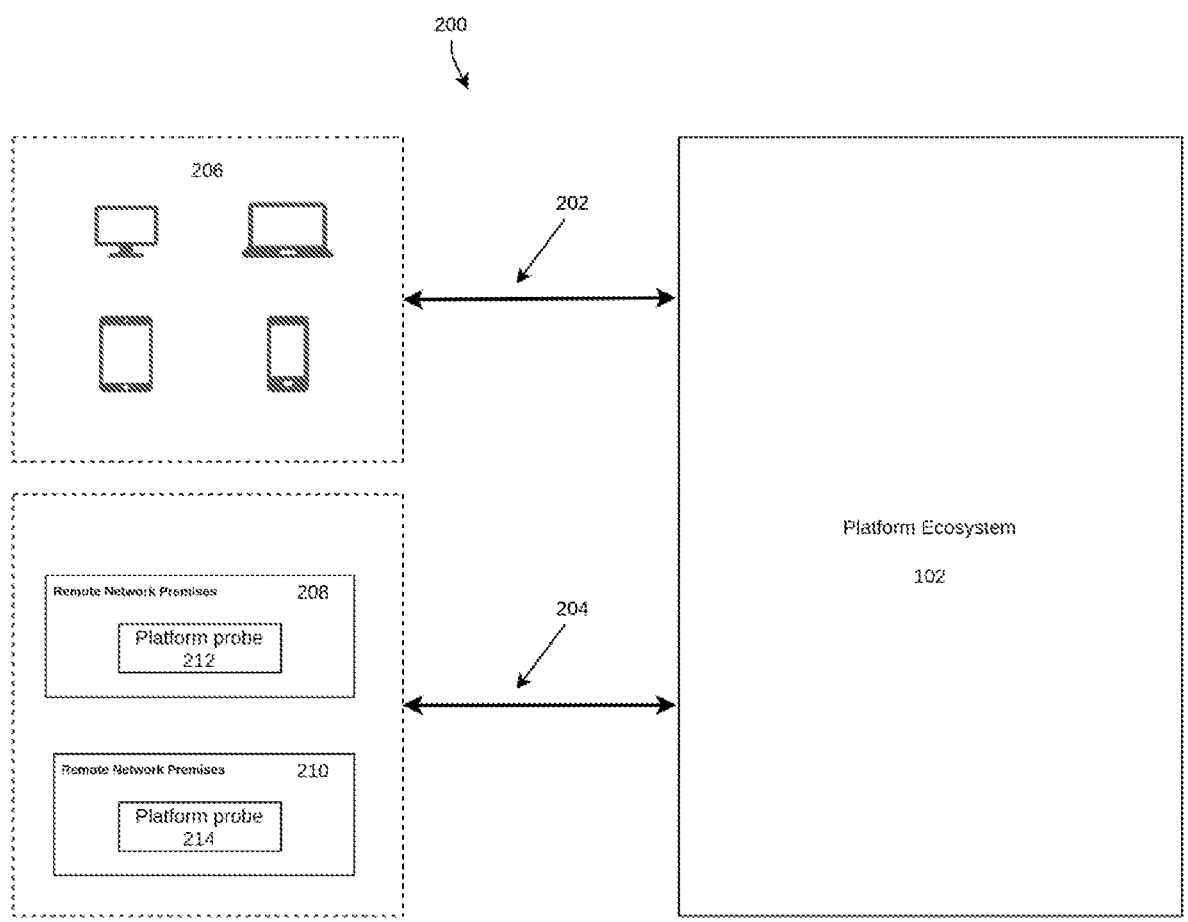
FIG. 2 shows interaction between the platform ecosystem and remote network premises with platform probes.

FIG. 2 shows a detailed view 200 of the interaction between platform ecosystem 102 and an extension of the platform to a remote network. Compressed data in JSON or XML passes by way of connections 202 between platform ecosystem 102 and user devices 206. Similarly, compressed data in JSON or XML passes between platform 102 and remote network premises 208 and 210. Remote network premises 208, 210 each include a platform probe (212, 214). Details of probes 212, 214 will be described below.

Figure 3:
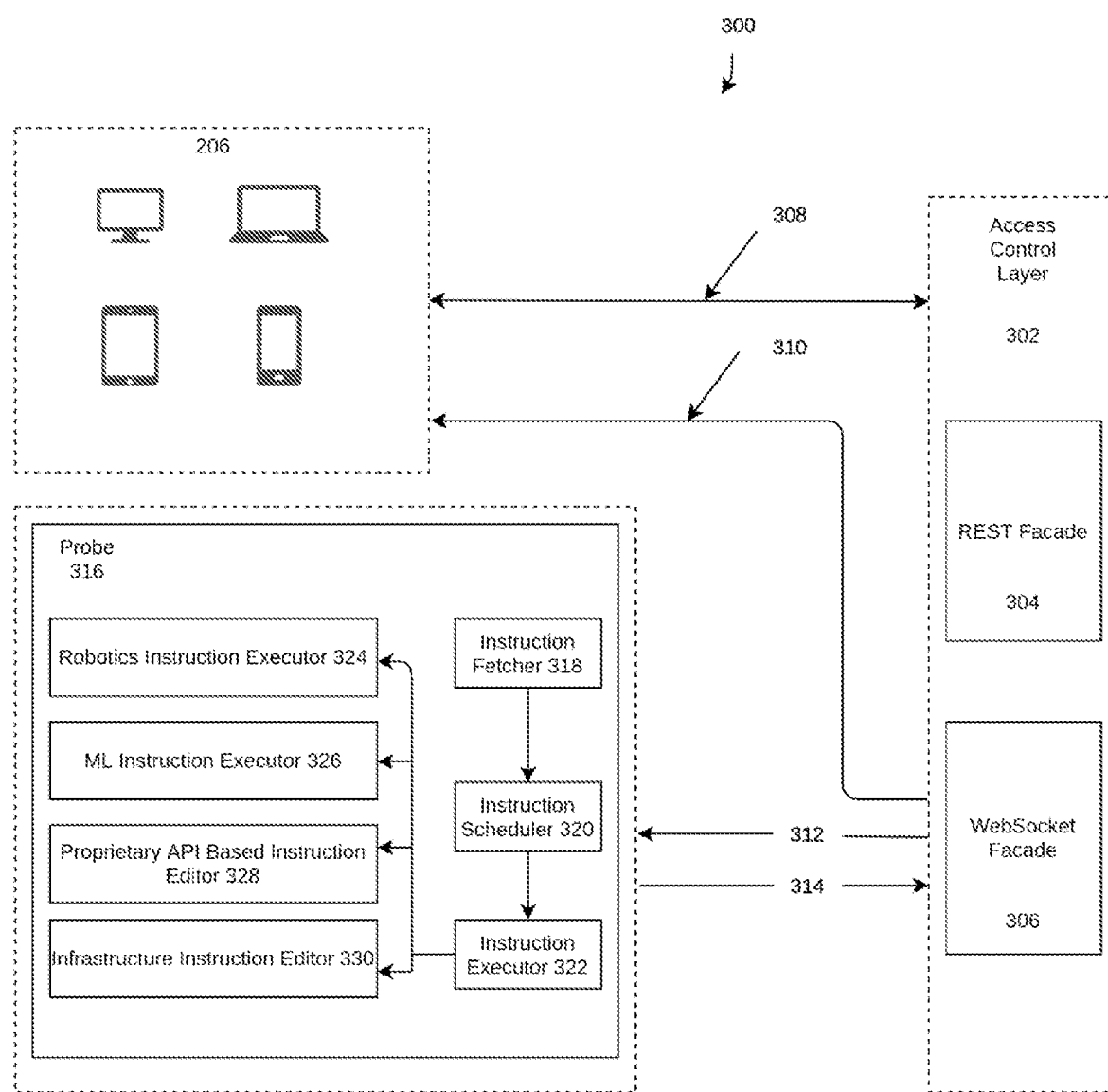
FIG. 3 shows details of interactions between an access control layer and a probe and user devices.

FIG. 3 shows details 300 of the interaction between access control layer 302, which comprises REST facade 304 and WebSocket facade 306, and user devices 206. Communication between user devices 206 and access control layer 302 takes place by way of HTTP 308 and WebSocket 310. Communication with access control layer 302 includes getting instructions 312 and sending data 314 between access control layer 302 and probe 316.

Figure 4:
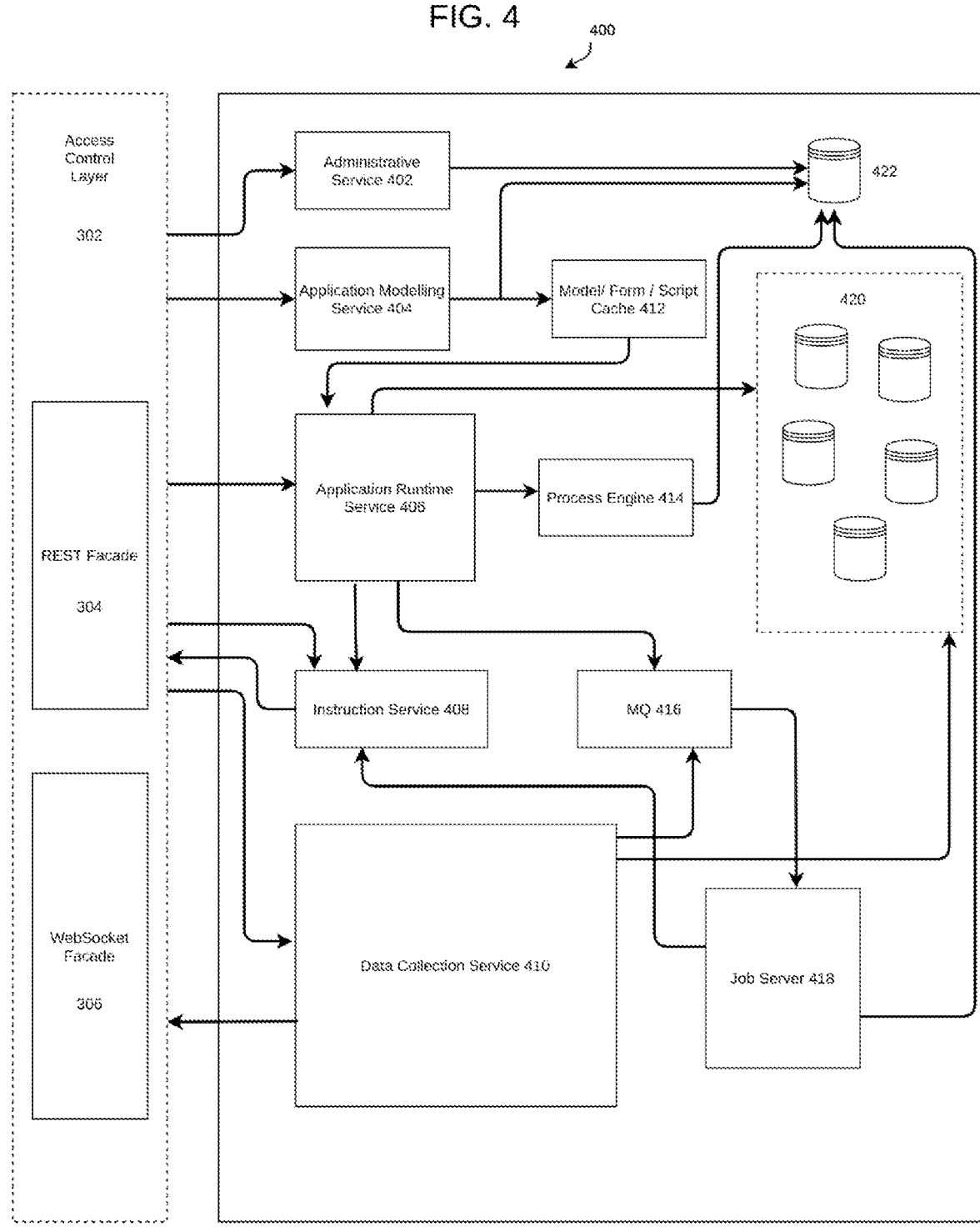
FIG. 4 shows details of interactions between the access control layer and the rest of the core platform ecosystem.

FIG. 4 shows detail 400 showing the interaction between access control layer 302 and the rest of the core platform ecosystem. Access control lawyer 302 communicates with administrative service 402, application modeling service 404, application runtime service 406 and data collection service 410. Application modelling service 404 uses cache 412 for models, forms, and scripts. Cache 412 is used by application runtime service 406 which outputs to process engine 414 and MQ 416, as well as to instruction service 408. Job server 418 receives input from MQ 416 and communicates with instruction service 408, which in turn interacts with access control layer 302. Data collection service 410 communicates with MQ 416 and data store 420. A command database (CMDB) 422 is accessible to administrative service 402, application modelling service 404, process engine 414, and job server 418.

Figure 5:
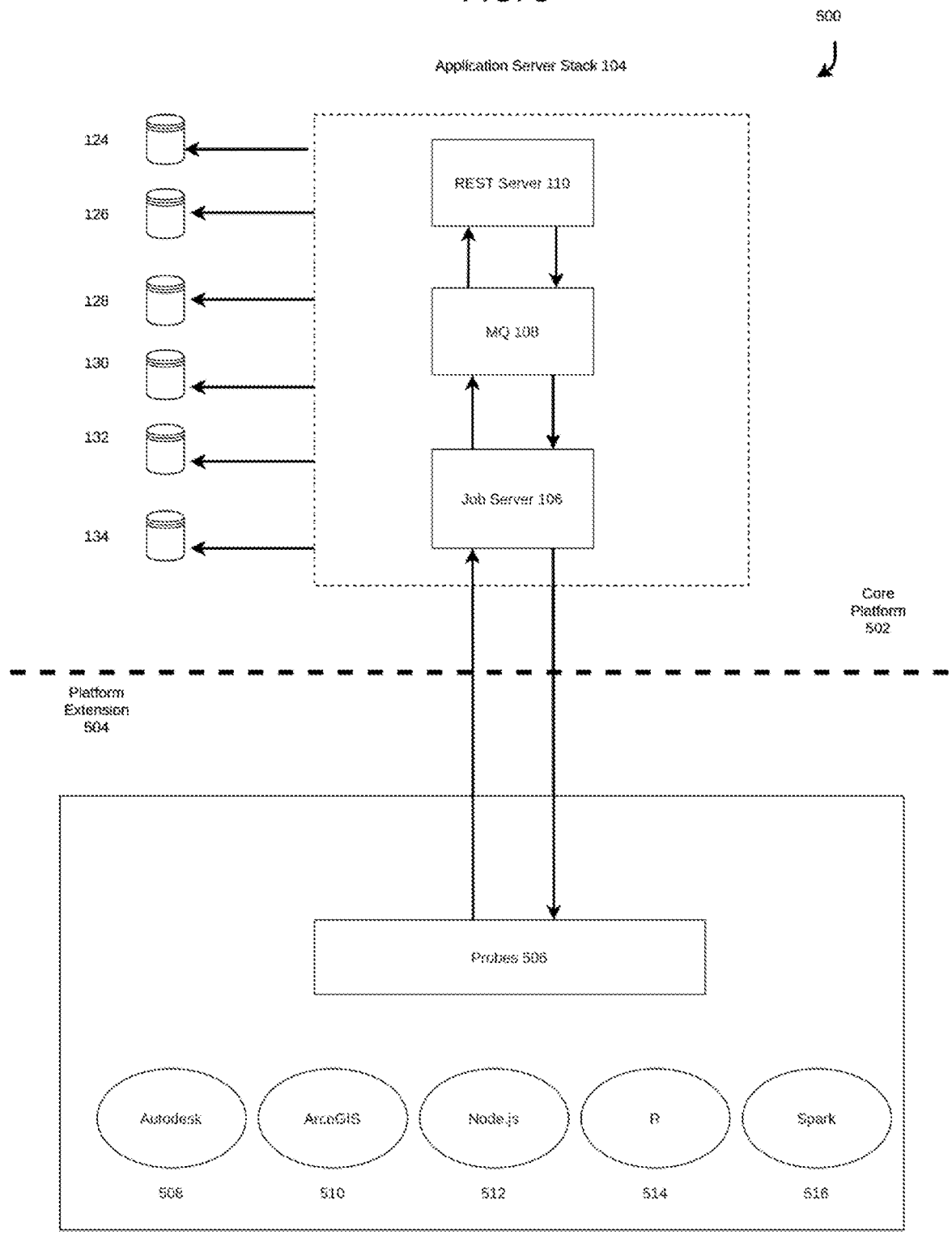
FIG. 5 shows logical-deployment details of interactions between probes associated with a platform extension and the core platform.

FIG. 5 shows detail 500 of communication between core platform 502 and platform extension 504. Application server stack 104 communicates with probes 506 located outside the platform core. The database stack supporting the core platform is supplied by databases 124, 126, 128, 130, 132, and 134. The number and choice of databases varies depending on particular use cases. Examples of possible choices are Cassandra, MongoDB, MySQL, MariaDB, ElasticSearch, and Redis.

Probes 506 include extension technologies 508, 510, 512, 514, and 516. Examples of such technologies include Autodesk, ArcGIS, Node.js, R, and Spark. The probe exposes an environment of libraries and APIs to interact with any external systems, via various techniques, e.g., an in-process client for an external system like a database or a proprietary system, a facilitator for executing an R script to an adjacent R execution environment, or a node.js JavaScript to be executed in an adjacent node.js etc.

Figure 6:
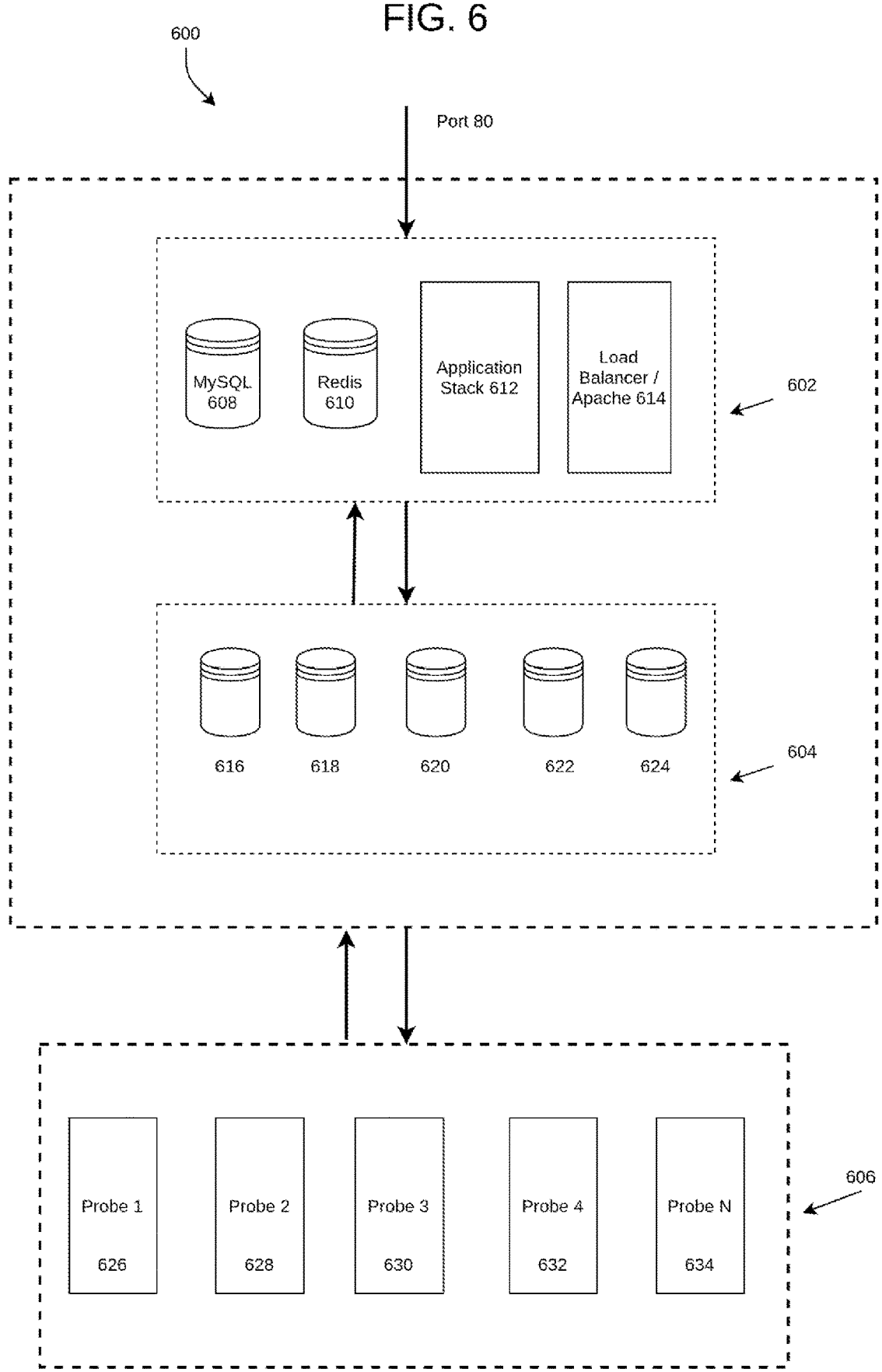
FIG. 6 shows physical-deployment details of interactions between an extension server and two platform servers.

FIG. 6 shows detail 600 of Unix platform server 602, Unix platform server 604 and extension server 606. Incoming communications using port 80 arrive at Unix platform server 602. In a typical embodiment, platform servers 602 and 604 run an open source Unix-based Linux distribution such as Ubuntu while platform server 606 may be proprietary, such as Microsoft Windows. The actual choice of operating system for each of servers 602, 604, and 606 may be changed according to particular use cases.

Platform 602 includes a MySQL database 608, Redis database 610, an application stack 612, a load balancer, and an HTTPD server. Platform 604 supports the database stack and includes databases 616, 618, 620, 622, and 624. On extension platform server 606 reside probes 626, 628, 630, 632, and 634.

One aspect of a probe of the present invention is that it executes scripts, for example, using programming languages such as Javascript, Jython, or Scala. Other languages may also be used, depending on particular use cases. The scripts use the embedded libraries and APIs that the probe exposes. The probe also downloads additional libraries, such as JAR files, to add additional functionality. A JAR file is a Java archive file format based on the ZIP file format that is used for aggregating many files into one.

Another aspect of the probe is that it establishes connection with the platform and polls for "instructions" to be executed in the probe on schedule. The instructions are posted in the platform, tagged for a probe. These instructions contain "Remote Execution Service" definitions, i.e., scripts that use probe libraries and APIs to connect to any external systems or technology and send collected data to the platform.

The probe is a standalone software component that sits in remote premises, in the vicinity of the target systems it is configured to connect to. It builds a conduit to the platform to execute specific connector instructions. Software connectors transfer control and data among system components. For example, MariaDB Connector/Node.js is a native Javascript driver used to connect applications developed on Node.js to MariaDB and MySQL databases. Connectors also provide services that are independent of the interacting components' functionalities. Examples of such services are persistence, invocation, messaging and transactions. These services are sometimes known as "facilities components" by middleware standards such as CORBA, DCOM and RMI.

In an embodiment, the probe is a framework for connectors, rather than an in-built connector. Hence the probe exposes an environment to execute scripts to inter-operate with an external system. The probe can load additional client libraries on-demand to connect to proprietary technologies. The probe, being a standalone component in the customer premises, its environment is not opaque as the platform and can be boosted with other software components. In an embodiment, all connectors in the probe are scripts to facilitate specific handling of data. Data collected and curated by the probe is sent to the platform, where it can be further manipulated in a historical context. An appropriate datastore is chosen depending on the nature of the data. In an embodiment, Influxdb or Cassandra are chosen for time-series data, Redis for geodesic data, and MariaDB ColumnStore for huge amounts of structured relational data. As new datastores are developed, they may be chosen using the same or similar criteria.

Figure 7:
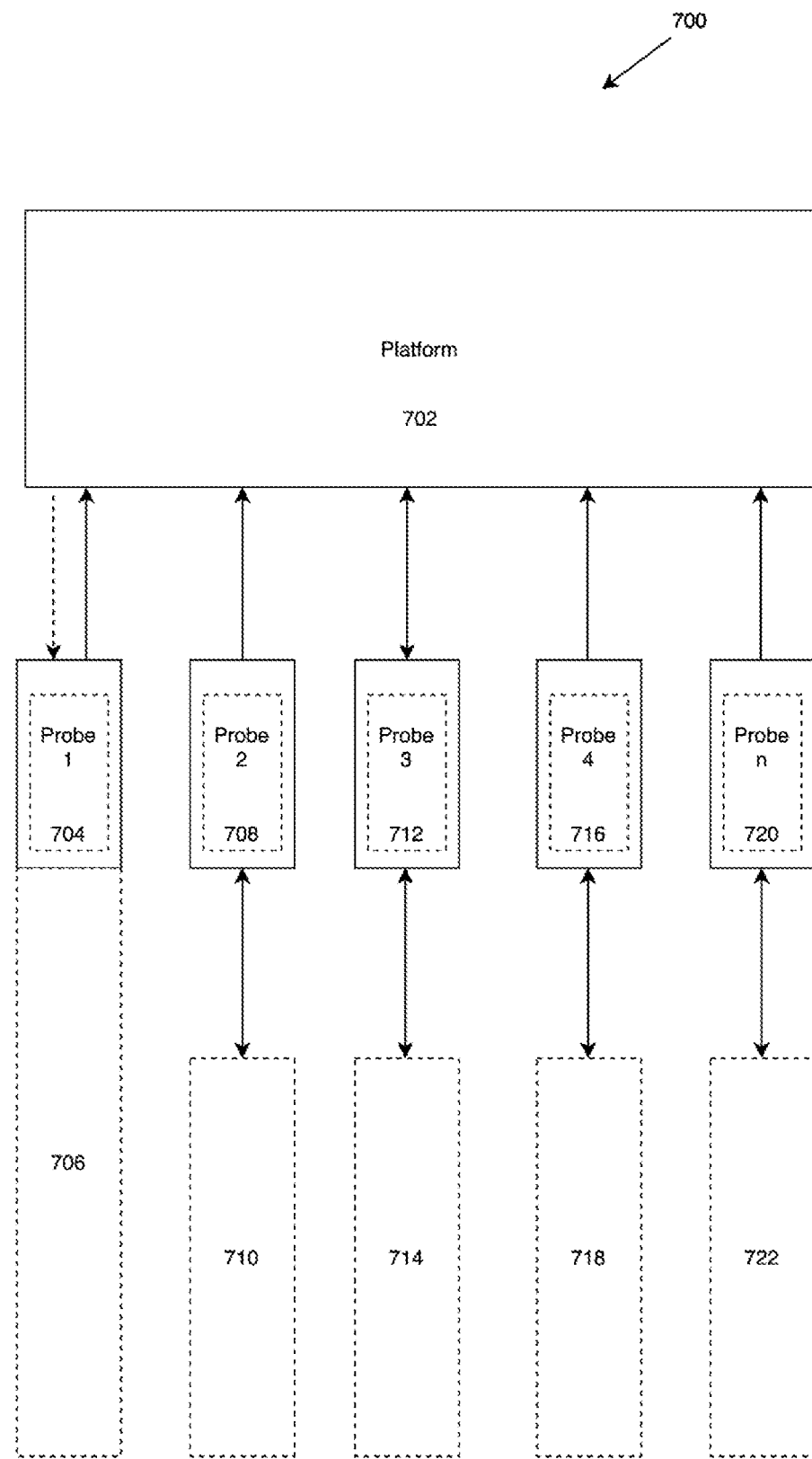
FIG. 7 shows details of platform-extending probes in various configurations.

FIG. 7 shows detail 700 of platform 702, an embodiment of platform server 602 described above. In this embodiment, one or more probes are configured to carry out specific tasks. These specific tasks could be duplicated by one or more probes or distributed among the probes in various combinations. Illustrative examples of tasks performed by the probes include platform or technology extension, client data integration, fetching data from third-party providers, remote monitoring and management, or receiving data on-demand.

First probe 704 is configured for and includes platform extension or technology integration 706 such as Autodesk, ArcGIS, Node.js, R, and Spark.

Second probe 708 communicates with integrated client data 710. In an embodiment, this integrated client data 710 includes connected applications or databases via APIs. Alternatively, integrated client data 710 is a subscribed message queue that uses, for example, the Advanced Message Queuing Protocol (AMQP) or the Message Queuing Telemetry Transport (MQTT). In another embodiment, integrated client data 710 comprises web scraping or desktop applications with Robotic Process Automation ("RPA"). In this context, RPA generally refers to software robotics that automate business-process activities.

Third probe 712 is linked to a third-party data provider 714. In an embodiment, data retrieved from the third party is accessed by third probe 712 but not replicated in other parts of the platform.

Fourth probe 716 is configured for remote monitoring or management of one or more resources 718. Exemplary monitored or managed resources 718 include a router, a firewall, a hub or router, mobile devices, laptop computers, Internet Protocol telephones, and websites. A system or network comprising different combinations of these resources is monitored or managed by fourth probe 716.

Probe n 720 receives data on-demand from data source 722. Data source 722 alternatively comprises one or more kinds of internet sockets. In an embodiment, the sockets comprise raw User Transmission Control Protocol (TCP)/User Datagram Protocol (UDP) sockets. Alternatively, source 722 comprises Simple Object Access Protocol (SOAP) or Representational State Transfer (REST) interfaces. Source 722 may also comprise custom HTTP servers.

Figure 8:
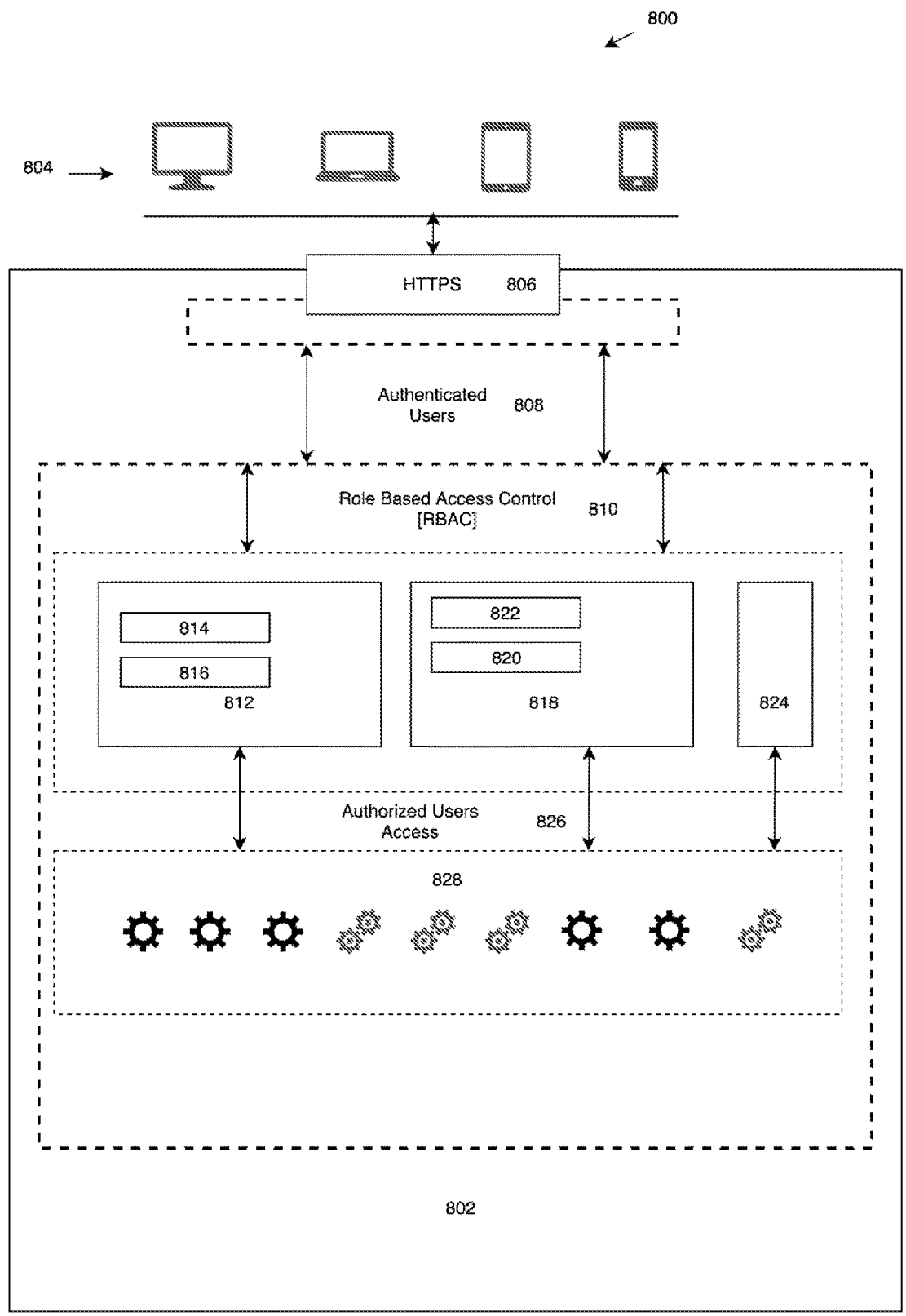
FIG. 8 shows details of application security for an orchestration platform.

FIG. 8 shows detail 800 showing security aspects of platform 802. Remote devices 804, such as desktop computers, laptop computers, tablets, and mobile phones, communicate with platform 802 by way of secure hypertext transfer protocol (HTTPS) 806. Authenticated users 808 are given access by way of role-based-access-control (RBAC) to one or more accounts. In an embodiment, available accounts are a first account 812 with applications (814, 816) and a second account 818 with applications (820, 822) and additional accounts represented by account n 824. The accounts 812, 818, through 824 are accessible to authenticated users. These accounts in turn have access to platform services 828.

Applications 814, 816, 820, and 822 may receive dedicated service from RBAC 810. For example, in an embodiment application 814 has on-demand security. In another embodiment, application 820 has on-demand data classification.

Figure 9:
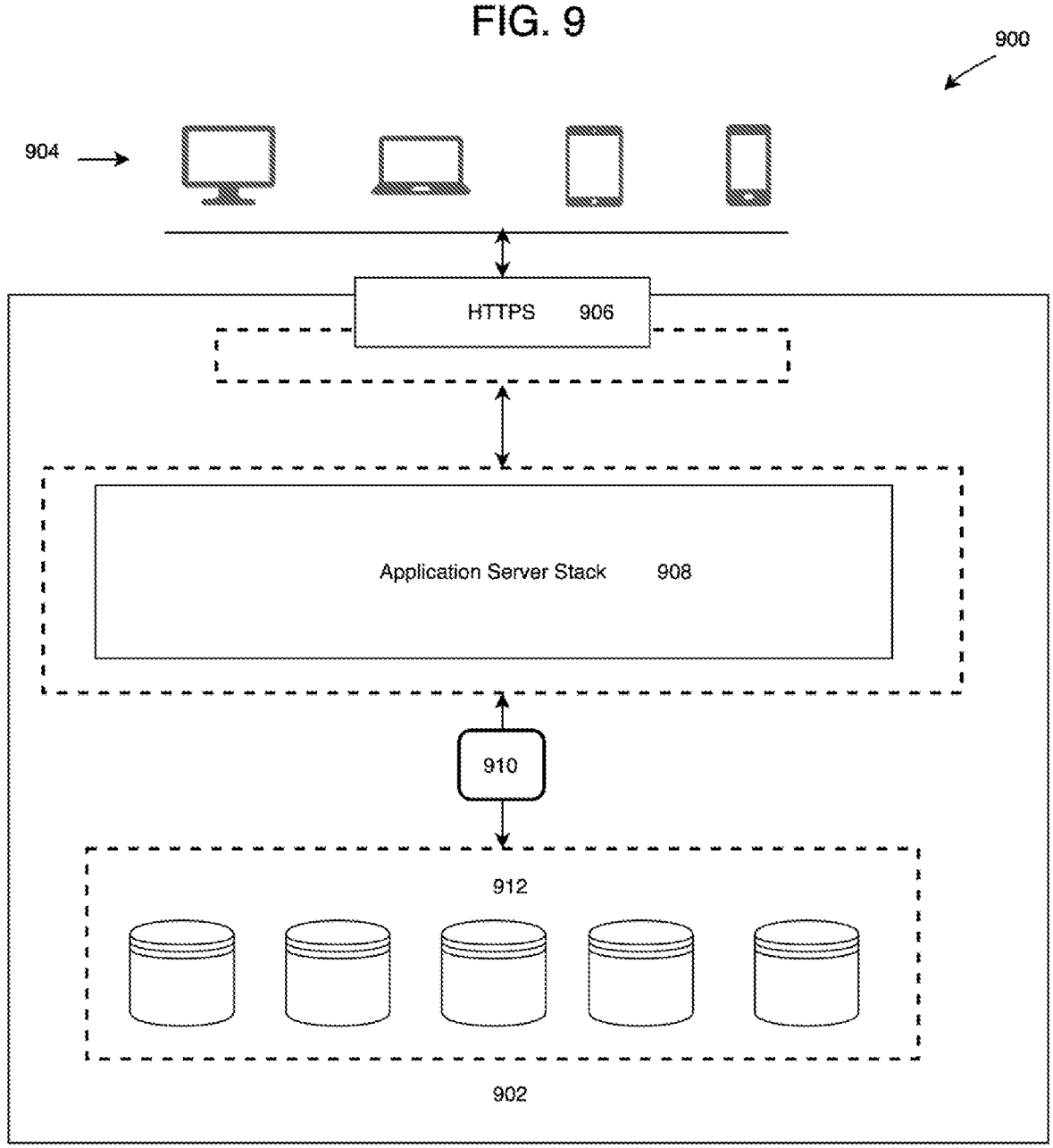
FIG. 9 shows details of data and storage security for an orchestration platform.

FIG. 9 shows detail 900 of security aspects of platform 902. In an embodiment, platform 902 is the same platform as platform 802 in FIG. 8. Remote devices 904, such as desktop computers, laptop computers, tablets, and mobile phones, communicate with platform 902 by way of secure hypertext transfer protocol (HTTPS) 906 to access application server stack 908. The application server stack in turn communicates with one or more databases 912.

Data passing from application server 908 is encrypted by process 910. In an embodiment, process 910 uses SHA2 Encryption.

Figure 10:
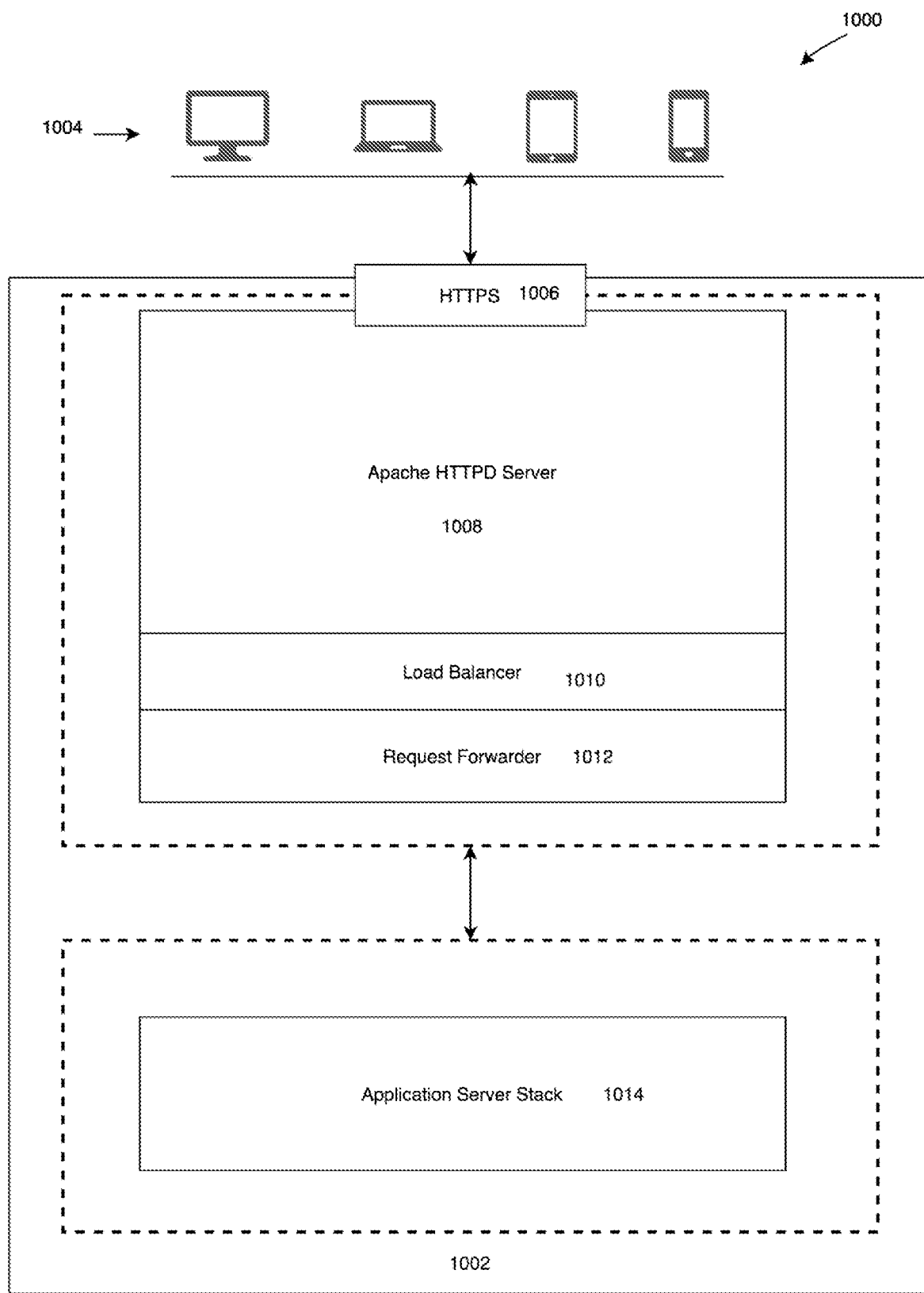
FIG. 10 shows details of transport and network security for an orchestration platform.

FIG. 10 shows detail 1000 of security aspects of platform 1002. In an embodiment, platform 1002 is the same platform as platform 802 in FIG. 8 or the same platform as platform 902 in FIG. 9. Remote devices 1004, such as desktop computers, laptop computers, tablets, and mobile phones, communicate with platform 1002 by way of secure hypertext transfer protocol (HTTPS) 906 to access a cross-platform web server 1008, such as Apache HTTPD server. Load balancer 1010 and request forwarder 1012 handle communication between server 1008 and application server stack 1014. In this configuration, transport and network security is provided by HTTPS.

The platform has a cluster architecture for dividing user requests among platform resources, such that a single user request can be handled and delivered by multiple server nodes.

In an embodiment, the platform includes up to four application servers. In a further embodiment, these application servers are configured to be horizontally scaled. One of these servers acts as a portal server. This server serves static content, such as html content, and bundled libraries, such as JavaScript libraries. In a further embodiment, additional portal server nodes are added, and reverse proxied in the Apache HTTPD server which fronts all requests. A reverse proxy is a configuration where a server is positioned in front of web servers and forwards client requests to those web servers.

In an embodiment, the platform includes a web server. The web server serves dynamic data as a REST request and response cycle. In a further embodiment, additional web server nodes are added, and reverse proxied by the Apache HTTPD server.

In an embodiment, the platform includes a job server. The job server executes background jobs as part of process models. In a further embodiment, additional nodes of job server are added to the application server stack. Job server nodes are idempotent, such that only one node executes a job at the same time, by acquiring a lock on the persistent job store.

In an embodiment, the platform includes a collector server that collects data from probes. In a further embodiment, additional nodes of the collector server are added to the application server stack. Collector server nodes subscribe to various probe data receiver queues, and the queues serve data in a round-robin strategy. Round robin refers generally to rotating requests among web servers in the order the requests are received. This strategy ensures that only one collector server node processes the same data at the same time.

The platform further provides semantics for distributed locking and distributed caching to manage clustered data processing environments as needed. Distributed locking is a technique that ensures that two processes cannot both access shared data at the same time. The locking protocol ensures that only one process is allowed to proceed once a lock is established. In distributed caching, user data is not stored in the individual web server's memory, but on other available resources. Cached data is accessible to an application's web servers or virtual machines. The cached data remains accessible to every server that runs the application, even when the application scales by adding or removing servers, or when servers are replaced due to upgrades or faults.

The invention claimed is:

1. A computer system platform for data orchestration comprising:
   a platform core with an application stack and a database stack;
   an extension server, remote from the platform core;
   a probe comprising a standalone software component, installed on the extension server and in communication with the platform core by way of one or more connector;
   wherein the extension server with the installed probe is located proximate to a target system and wherein the target system is external to the platform core and comprises a datastore and a library corresponding to a programming language;

the probe is configured to execute scripts that request data from the datastore in the programming language of the target system;

a plurality of application servers in communication with the platform core, including a collector server; and wherein the target system further comprises an application program interface ("API") connected to the library and the probe is configured to expose the API to make the library available to the platform core on-demand and receive data from the datastore at the platform core via the collector server.

2. The system of claim 1 wherein the plurality of application servers further includes at least two of a portal server, web server, and a job server.

3. The system of claim 1 wherein the plurality of application servers includes a portal server, web server, job server, and the collector server.

4. The system of claim 1 wherein the plurality of application servers includes a portal server in reverse proxy configuration, a web server, job server, and the collector server.

5. The system of claim 1 wherein the plurality of application servers includes a portal server in a reverse proxy configuration.

6. The system of claim 1 wherein the plurality of application servers includes a web server in a reverse proxy configuration.

7. A method of orchestrating data in a computer system comprising a platform core with an application stack and a database stack, an extension server, and an external target system, the method comprising:

installing a probe comprising a standalone software component on the extension server at a remote location;

configuring the probe to connect with the platform core, wherein the probe is installed on the extension server is in communication with the platform core by way of one or more connectors;

wherein the extension server with the installed probe is located proximate to the external target system and wherein the external target system is external to the platform core;

wherein the external target system comprises a datastore and a library corresponding to a programming language;

wherein the probe is configured to execute scripts that request data from the datastore in the programming language of the external target system;

configuring a plurality of application servers in communication with the platform core, including a collector server; and wherein the target system comprises an application program interface ("API") connected to the library and the probe is configured to expose the API and the library to the platform core on-demand and receive data from the datastore at the platform core via the collector server.

8. The method of claim 7 wherein the plurality of application servers further includes at least two of a portal server, web server, and a job server.

9. The method of claim 7 wherein the plurality of application servers includes a portal server, web server, job server, and the collector server.

10. The method of claim 7 wherein the plurality of application servers includes a portal server in reverse proxy configuration, a web server, job server, and the collector server.

11. The method of claim 7 wherein the plurality of application servers includes a portal server in a reverse proxy configuration.

12. The method of claim 7 wherein the plurality of application servers includes a web server in a reverse proxy configuration.

13. A computer system platform for data orchestration, the system comprising:

an extension server, remote from a platform core;

a probe comprising a standalone software component, installed on the extension server and in communication with the platform core by way of one or more connectors;

wherein the extension server with the installed probe is located proximate to an external target system and wherein the external target system remote from the platform core and comprises a datastore and a library corresponding to a programming language;

wherein the probe is configured to execute scripts that request data from the datastore in the programming language of the external target system;

a plurality of application servers in communication with the probe, including a collector server; and wherein the external target system comprises an application program interface ("API") connected to the library and the probe is configured to expose the API and the library to the platform core on-demand and receive data from the datastore at the platform core via the collector server.

14. The system of claim 13 wherein the plurality of application servers further includes at least two of a portal server, web server, and a job server.

15. The system of claim 13 wherein the plurality of application servers includes a portal server, web server, job server, and the collector server.

16. The system of claim 13 wherein the plurality of application servers includes a portal server in reverse proxy configuration, web server, job server, and the collector server.

17. The system of claim 13 wherein the plurality of application servers includes a portal server in a reverse proxy configuration.

18. The system of claim 13 wherein the plurality of application servers includes a web server in a reverse proxy configuration.

19. The system of claim 17 wherein the plurality of application servers further includes a web server in a reverse proxy configuration.

20. The system of claim 17 wherein collector server comprises nodes subscribed to probe data receiver queues, and the queues are configured to serve round-robin data to the platform core via the collector server.

* * * * *